United States Patent [19]

Poulin

[11] Patent Number: 4,525,277
[45] Date of Patent: Jun. 25, 1985

[54] METHOD FOR CLEANING A SEPTIC TANK

[76] Inventor: Maurice Poulin, 1559, 50ième Ave., Ste-Lucie des-Laurentides, Canada, J0T 2J0

[21] Appl. No.: 588,318

[22] Filed: Mar. 12, 1984

[30] Foreign Application Priority Data

Jan. 13, 1984 [CA] Canada ............................. 445281

[51] Int. Cl.³ ............................................. B01D 00/00
[52] U.S. Cl. .................................. 210/601; 210/747; 210/170; 210/241; 210/532.2; 137/267; 137/351; 15/302; 15/340
[58] Field of Search ............... 210/241, 257.1, 253, 210/532.2, 170, 747, 194, 748, 319, 600, 601, 622; 141/231; 134/167, 168 C, 169, 1, 8, 22.18; 137/267, 351; 15/340, 302; 280/5 D

[56] References Cited

U.S. PATENT DOCUMENTS

| 2,638,224 | 5/1953 | Rupp | 137/351 |
|---|---|---|---|
| 3,228,531 | 1/1966 | Proudman | 210/532.2 |
| 3,262,571 | 7/1966 | Petretti | 210/241 |
| 3,267,509 | 8/1966 | Boyd | 15/340 |
| 3,317,049 | 5/1967 | Petretti | 210/241 |
| 3,630,365 | 12/1971 | Woodrige et al. | 210/241 |
| 3,920,552 | 11/1975 | Elkern | 210/241 |
| 4,159,248 | 6/1979 | Taylor et al. | 210/241 |
| 4,199,837 | 4/1980 | Fisco, Jr. | 15/340 |
| 4,201,597 | 5/1980 | Armstrong et al. | 210/532.2 |
| 4,207,647 | 6/1980 | Masters | 15/340 |
| 4,234,980 | 11/1980 | Divito et al. | 15/340 |
| 4,322,868 | 4/1982 | Wurster | 15/340 |
| 4,389,314 | 6/1983 | Petretti | 210/241 |

FOREIGN PATENT DOCUMENTS

| 1036771 | 8/1958 | Fed. Rep. of Germany | 210/532.2 |
|---|---|---|---|
| 1440849 | 4/1966 | France | 210/241 |

Primary Examiner—Benoit Castel
Attorney, Agent, or Firm—Robic, Robic & Associates

[57] ABSTRACT

A method for cleaning a septic tank provided with at least two successive fermentation and decantation compartments connected to each other by a lateral opening. According to this method, the light and/or heavy sludges contained in each compartment are pumped and discharged in a waste tank whereas the bacteriological liquid medium of both compartments is pumped out and stored in a storage tank. The liquid medium kept in the storage tank is reintroduced into the septic tank after the same has been cleaned, to reactivate said tank thereby making it immediately operative. A tanker especially designed for carrying out this method is also disclosed.

22 Claims, 2 Drawing Figures

METHOD FOR CLEANING A SEPTIC TANK

BACKGROUND OF THE INVENTION (a) Field of the invention

The present invention relates to a method for cleaning a septic tank, which method permits preservation of the bacteriological medium and causes an important reduction in the amount of waste withdrawn. The disclosure also relates to a tanker for carrying out this inventive method.

(b) Brief description of the prior art

The conventional method commonly used for cleaning septic tanks consists in completely emptying all the fermentation and decantation compartments of the septic tank by means of a pump that sucks up their content. The heavy sludges which are generally sedimented and the light sludges floating onto the surface of the bacteriological liquid medium are suck up together with the liquid medium, thereby forming a very liquid mixture once stocked in a tanker. In practice, this method necessitates reformation by sowing of a new population of septic bacteria after each cleaning, before the tank may take again its digestive work. Furthermore, this method provides large volumes of liquid waste that are source of pollution for the environment and involve considerable cost for their treatment, disposal and transport.

SUMMARY OF THE INVENTION

The object of the present invention is to provide a method for cleaning septic tanks, which method allows preservation of the bacteriological medium of the septic tank thereby making it re-operational immediately after its cleaning, and allows reduction from 60 to 80% of the volume of waste to be transported toward a burrying or treating site. This reduction in the volume of waste allows substantial saving in fuel as the same tanker may be used for cleaning several septic tanks consecutively before having to discharge its load. This reduction also allows substantial saving in the cost of treatment as the recovered waste contains little water only and thus may be "recycled" after eventual adjustment of their water content by evaporation or drying. This recycling may consist in mixing the recovered waste with bio-mass residues such as sawdust, barks, turf, etc. to form a compost usable as a soil conditionner.

More particularly, the present invention proposes a method for cleaning a septic tank of the type comprising at least two successive fermentation and decantation compartments connected to each other by means of a lateral opening, each compartment containing a bacteriological liquid medium and a layer of heavy sludges sedimented or not in its bottom, the first one of said successive compartments also containing a layer of light sludges which are usually constituted of fats, oils and/or light solids, floating on the surface of its bacteriological medium. This method is characterized in that it comprises the successive steps of:

pumping the light sludges floating on the surface of the bacteriological liquid medium contained in the first compartment and discharging them into a waste tank;

slowly pumping the bacteriological liquid medium contained in each of the compartments, and storing it into a storage tank;

semi-liquifying the heaviest sludges sedimented in the bottom of each of the compartments;

pumping the so semi-liquified sludges and discharging them into said waste tank; and reintroducing the bacteriological liquid medium stored in said tank into all the compartments of the tank.

Alternatively, the method according to the invention may comprise the successive steps of:

slowly pumping the bacteriological liquid medium contained in all the compartments of the tank via the last compartment of the tank and storing it into a storage tank, said pumping being stopped when the light sludges start flowing through the lateral opening connecting the compartments to each other;

semi-liquifying the heavy sludges sedimented in the bottom of each compartments;

pumping the so semi-liquified heavy sludges, and eventually the light sludges, together with the bacteriological medium still contained in each compartment of the tank, below the level of the lateral opening, and discharging them into said waste tank; and reintroducing the bacteriological liquid medium stored in the storage tank into all the compartments of the tank.

The last step of the method according to the invention and its alternative is preferably carried out by mere opening of a gravity or pressurized valve connected to the storage tank, this valve being connected to a hose having its free end inserted in either compartments of the septic tank.

The pumping of the light and semi-liquified heavy sludges or of the bacteriological medium toward their respective waste tank or storage tank is carried out with vacuum pumps. Advantageously, a single vacuum pump is used, the outlet of this pump being connected to a by-pass conduct including a selection valve.

For semi-liquifying the heavy sludges sedimented in the bottom of the compartments, water may be injected under high pressure and low flow rate into the heavy sludges. Alternatively, vibrations may be mechanically produced into the heavy sludges with a vibrating member dipped therein. The vibrating member may comprise a concrete vibrating device producing at least 10,000 vibrations per minute when operated by a $\frac{3}{4}$ H.P. electric motor connected to an electric generator having a minimal capacity of 600 W.

Preferably, the vibrating device is fixed to the free end of the inlet hose of the vacuum pump, which is introduced into the compartments of the septic tank for pumping the sludges.

Water injection is advantageously carried out with a water hose nozzle connected to a pump having an output of 60 to 130 liters of water per minute under a minimal pressure of about 50 bar, preferably under an average pressure of about 100 bar. The high pressure injection of water advantageously permits to scour the walls compartment of the tank while cleaning the same.

The method according to the invention is especially intended for use in cleaning septic tanks. However, it can also be used for introducing a new, active bacteriological medium into the fermentation-decantation compartments of a septic tank in which the septic bacteria have been killed by inadvertant disposal of expired drugs and/or other chemical products in a toilet bowl or drain.

The disclosure also proposes a tanker for carrying out the above-mentioned inventive method, which tanker is mounted on a wheeled framed, namely a truck or trailer frame, and comprises a plurality of tanks including:

a waste tank for receiving and stocking light and heavy sludges pumped from the fermentation and decantation compartments of the septic tank, this waste tank being provided with loading means including a vacuum pump, and with unloading means;

a clear water tank provided with a filling means and emptying means, said emptying means comprising a high pressure pump, preferably a pump having an output of 60 of 130 l. of water per minute under a minimal pressure of about 50 bar, advantageously an average pressure of about 100 bar, said pump having its inlet connected to said clear water tank and its outlet connected to a water nozzle via a water hose; and a storage tank for receiving and storing the bacteriological liquid medium of the fermentation and decantation compartments, said storage tank being provided with filling means including a vacuum pump, and with emptying means.

Advantageously, the tanker may be provided with a vibrating member intented to be introduced in the compartments for liquifying the sedimented sludges, such member being preferably mounted at the free end of the inlet hose of the vacuum pump of the waste tank. This free end may further be provided with a mesh for avoiding jamming of the inlet hose by non-digested solid waste or chunks. This vibrating member may advantageously consist of a concrete vibrating device having a frequency of at least 10,000 vibrations/minute and comprising an electric motor of ¾ H.P. connected to an electric generator having a minimal capacity of 600 W. The use of a vibrating member is particularly advantageous for cleaning deep septic tanks where washing under high pressure is difficult or impossible, or for cleaning septic tanks of which the top part may be completly removed to facilitate handling of the inlet hose having a vibrating member mounted thereto.

The waste and storage tanks are preferably connected to the same vacuum pump via a by-pass conduct including a selection valve. In addition, both tanks are preferably made from a single tank divided in two by a movable wall, namely a wall of the type sold by J. Huwer S.A. of France.

Discharging of the light and heavy sludges contained in the waste tank may advantageously be carried out by opening a door at the rear end of the waste tank and tilting of the tanker with a telescopic hydraulic jack. The movable wall may further act as a piston to push out the sludges contained in the waste tank, after having unlocked said wall and pressurized the storage tank.

The emptying means of the storage tank advantageously consists of a gravity valve of which the outflow may eventually be increased by pressurizing of said tank.

Each above-mentioned tanks are advantageously built to resist to a vacuum that may be lowered to about 0.95 bar and to an overpressure that may be raised to about 0.6 bar.

BRIEF DESCRIPTION OF THE DRAWINGS

The present invention will be better understood with reference to the following non-restrictive description of a preferred embodiment thereof, taken in connection with the following drawings wherein.

DESCRIPTION OF A PREFERRED EMBODIMENT

Figure 1:
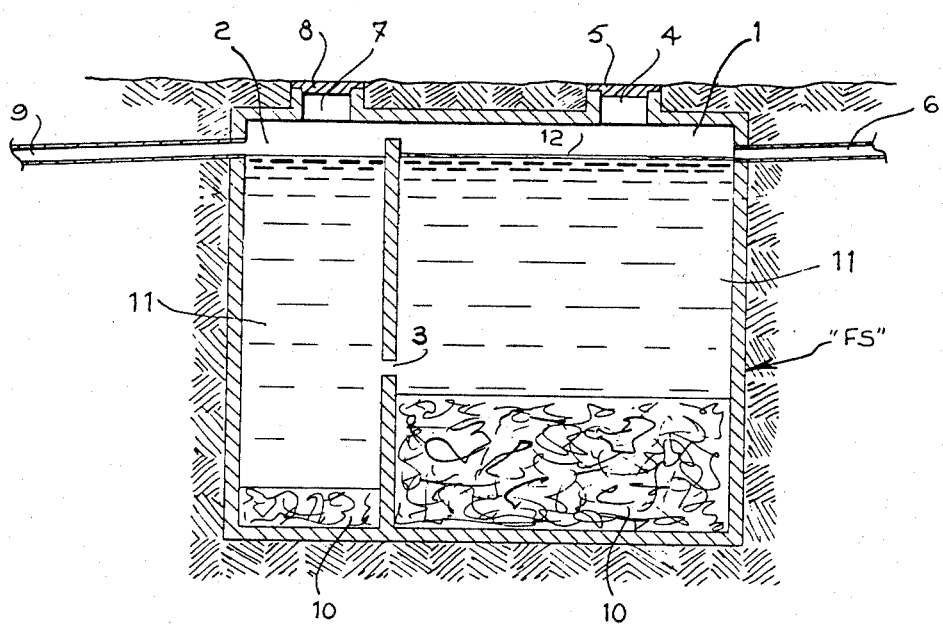
FIG. 1 represents a transversal side elevational view of a septic tank.
Figure 2:
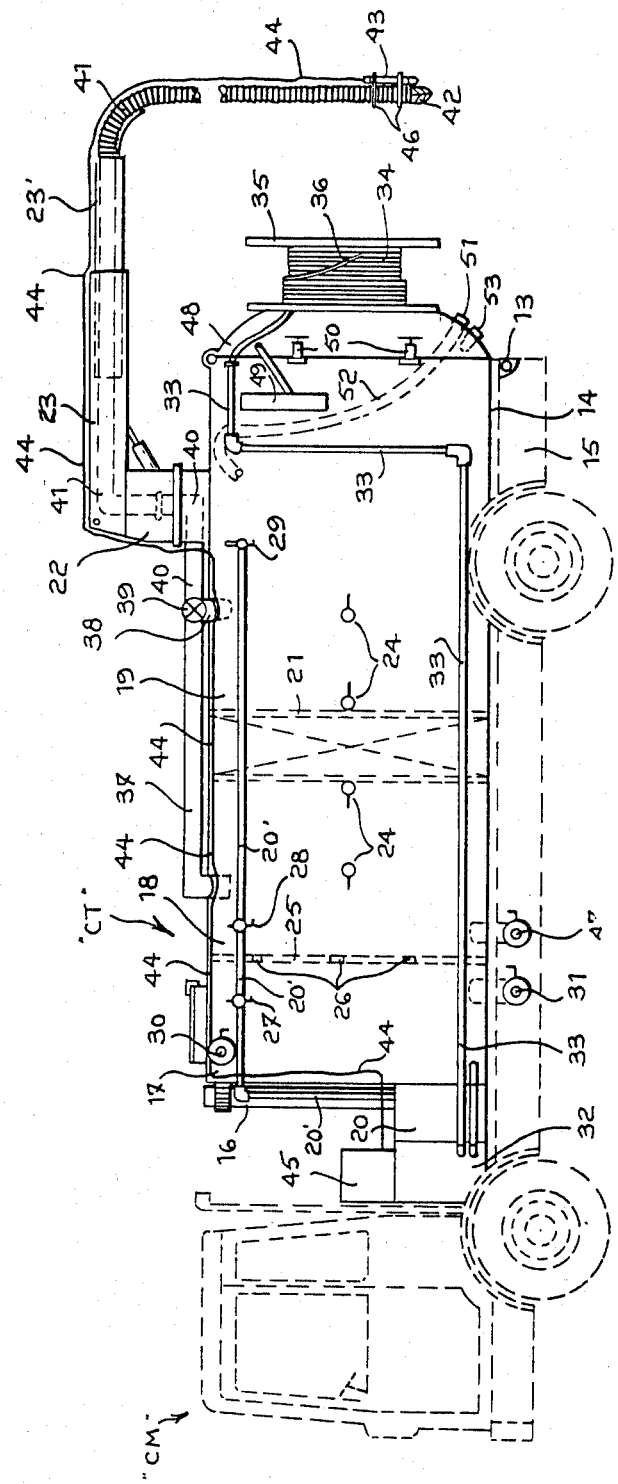
FIG. 2 represents a side elevational view of a tanker adapted to carry out the method of the present invention.

The method according to the invention is concerned with the cleaning of a septic tank "FS" (as illustrated in FIG. 1) by means of a tanker "CT" mounted on a truck "CM" (as illustrated in FIG. 2).

The septic tank "FS" to be cleaned, is of the type comprising a pair of fermentation and decantation compartments 1 and 2 connected to each other by a lateral opening 3. The compartment 1 has an opening 4 shut with a cover 5 (at the ground level) and an inlet 6 for the waste. The compartment 2 has an opening 7 shut with a cover 8 (at the ground level) and an overflow 9 connected to a conventional drain system (not illustrated). Before it is cleaned, each compartment of the tank "FS" contains, a layer of sedimented sludges 10 and a layer of bacteriological medium 11. The compartment 1 further contains a layer of light sludges 12 constituted of oils, fats and/or light solids.

The tanker "CT" is mounted on a frame 14 which is itself pivotably mounted on a truck frame 15. The tanker may be tilted around a pin 13 under the action of a telescopic, single way hydraulic jack 16, and comprises three distincts tanks respectively numbered 17, 18 and 19. The tanks 17 and 18 are separated by a wall 25 provided with closed openings 26 which may be opened to allow transformation of the three tanks 17, 18 and 19 into one single tank of large capacity (by way of example, when transporting clear water for road work purposes, etc..). The tanks 18 and 19 are separated by a movable wall 21 whose translation is limited by stoppers 24. Each tank may be selectively connected to a vane pump 20 capable of creating a vacuum as low as about 0.95 or of creating an overpressure as high as 0.6 bar, by means of a pipe 20' and a set of valves numbered 27, 28 or 29.

The tank 17 which may have, for example, a capacity of about 2,500 liters, comprises a valve 30. This valve may be used to suck up clear water in the tank when the same is put under a vacuum. The tank 17 also comprises a gravitary emptying valve 31 and a high pressure pump 32. The outlet of the pump 32 is connected to a water hose nozzle 36 via a pipe 33 and a hose 34 winded up around a reel 35.

The tanks 18 and 19 may have a combined capacity of 12,000 to 15,000 liters, the capacity of the tank 18 varying from 0 to 4,000 liters. These tanks are respectively connected to a filling means constituted by the pipes 37 and 38 connected to the outlets of the selection valve 30 whose inlet is connected to a pipe 40. This pipe 40 is in part positioned inside a turret 22 mounted at the rear end of the tanker "CT", which turret is topped with a hydraulic boom 23 provided with a telescopic arm 23' supporting a hose 41 connected to the pipe 40. The free end of the hose 41 is provided with a grid 42 and with a concrete vibrating device 43 connected via an electric wire 44 to a generator 45. This vibrator 43 is mounted on the hose 41 with bands 46 and comprises a ¾ H.P. electric motor providing 10,000 vibrations per minute. Once one of the tanks is put under vacuum at a pressure as low 0.95 bar, the above-mentioned filling means becomes, according to the selection of the valve 39, a vacuum pump for filling the tank 18 or loading the tank 19.

The tank 18 is provided with a gravity emptying means constituted by a valve 47, which may have its outflow increased up to about to 0.6 bar by pressurization of the tank 18 by means of the pump 20 and opening of the valve 28.

The tank 19 is provided with a rear door 48 for unloading its content. This unloading may be obtained by tilting the tanker "CT" and/or by operating the movable wall 21 as a piston after having unlocked stoppers 24 and pressurized the tank 18. The opening of the rear door 48 can be made easier by using a hydraulic jack 49 after having disengaged the locks 50.

The tank 19 is further provided with conventional rear sucking means including a valve 51 connected to pipe 52 and a conventional rear emptying gravity valve 53.

For cleaning a septic tank "FS" with a tanker "CT", the operator may carry out the following steps:

First step

The operator has first to introduce the free end of the hose 41 through the opening 4 of the compartment 1 and brings it down into the layer 12 constituted of oils, fats and/or light solids floating on the surface of the bacteriological medium 11. Then, he sets the selection valve 39 for connecting the pipes 38 and 40, turns on the valve 29 and starts the pump 20 to create a vacuum in the tank 19 for pumping the layer 12 therein. Once this layer 12 is pumped, the pump 20 is stopped and the valve 29 is turned off. Then the operator brings down the free end of the hose 41 into the bacteriological medium 11, sets the valve 39 to connect the pipes 37 and 40, turns on the valve 28 and starts the pump 20 to create a vacuum in the tank 18 for pumping the bacteriological medium 11 contained in the compartment 1. Thereafter, the operator transfers the free end of the hose 41 in the bacteriological medium 11 still contained in the compartment 2, via the opening 7, and continues to pump said medium into the tank 18. The operator may also introduce the free end of the hose 41 through the opening 7 of the compartment 2 and brings it down in the bacteriological medium, at a level below the lateral opening 3. He sets the selection valve 39 to connect the pipes 37 and 40, turns on the valve 28 and starts the pump 20 to create a vacuum in the tank 18 for pumping the bacteriological medium therein. This pumping is stopped when the layer 12 starts to flow from the compartment toward the compartment 2 via the lateral opening 3.

Second step

After the first step has been completed, the operator starts the pump 32 to pump clear water contained in the tank 17 under a high pressure and a low flow rate in the compartments 1 and 2, via the pipe 33 and the hose 34 winded on the reel 35, and the water hose nozzle 36, to semi-liquify the sludges 10. Once this semi-liquefaction is made, the pump is stopped, and the operator successively introduces the free end of the hose 41 in the bottom of either compartment 1 and 2, sets the selection valve 39 to connect pipes 38 and 40, turns on the valve 29 and starts the pump 20 to thus create a vacuum in the tank 19 and pump the sludges 10 and eventually 12, therein. Of course, the pumping of sludges 10 or 12, and the high pressure washing may be carried out simultaneously.

Alternatively, the operator may introduce successively the free end of the hose 41 in the bottom of either of the compartment 1 and 2, starts the electric generator 45 that is connected, via an electric wire 44, to a concrete vibrating device 43 for semi-liquifying the sludges 10 and eventually the layer 12 of the light sludges, sets the selection valve 39 to connect the pipes 38 and 40, turns on the valve 29 and starts the pump 20 to thus create a vacuum in the tank 19 and pump the sludges 10 and eventually the layer 12 of light sludges, therein. Once the compartments 1 and 2 are emptied, the electric generator 45 is stopped. If necessary, the operator may starts the pump 32 in order to pump clear water contained in the tank 17 under a high pressure and a low flow rate, via the pipe 33, the hose 34, and the water hose nozzle 36, against the wall of the compartments 1 and 2 to thus scouring them, the pieces of waste so scoured being thereafter pumped in the tank 19.

Thereafter, the pump 20 or the pumps 20 and 32 are stopped and the valve 29 is turned off.

Third step

The operator connects a hose to the valve outlet of the valve 47 of the tank 18 containing the bacteriological medium 11 so as the free end of this hose ended in either of the compartments of the septic tank "FS", and turns on said valve until the septic tank is filled up with said medium 11.

After having cleaned, in a similar manner, several septic tanks "FS" the operator may unload the solid or semi-solid waste stocked in the tank 19 by opening the rear door 48, and tilting the tanker "CT" by means of the jack 19 and/or moving the movable wall 21 after having unlocked the stoppers 24 and pressurized the tank 18, this pressurization of the tank 18 being obtained by starting the pump 20 and turning on the valve 28.

What is claimed is:

1. A method for cleaning a septic tank comprising at least two successive fermentation and decantation compartments connected to each other by means of a lateral opening, each compartment containing a bacteriological liquid medium and a layer of heavy sludges sedimented or not in its bottom, the first one of said successive comparments also containing a layer of light sludges floating on the surface of its bacteriological liquid medium, said method comprising the successive steps of:
    pumping the light sludges floating on the surface of the bacteriological liquid medium contained in the first compartment and discharging them into a waste tank;
    slowly pumping the bacteriological liquid medium contained in each of the compartments, and storing it into a storage tank;
    semi-liquifying the heavy sludges sedimented in the bottom of each of the compartments;
    pumping the so semi-liquified sludges and discharging them into said waste tank; and
    reintroducing the bacteriological liquid medium store in said tank into all the compartments of the tank.

2. A method according to claim 1, wherein the light sludges, the bacteriological medium and the semi-liquified sludges are pumped toward their respective tank with vacuum pumps.

3. A method according to claim 2, wherein the light sludges, the bacteriological medium and the semi-liquified sludges are pumped toward their respective tank with a single vacuum pump connected to a by-pass conduct and a selection valve.

4. The method of claim 1, wherein the semi-liquefaction step is carried out by injection of high pressure water into the heavy sludges.

5. The method of claim 4, wherein the water injection is carried out with a water hose nozzle connected to a pump having an outflow of 60 to 130 liters of water per minute under a minimal pressure of about 50 bar.

6. The method of claim 5, wherein the water injection is carried out with a water hose nozzle connected to a pump having an outflow of 60 to 130 liters of water per minute under an average pressure of about 100 bar.

7. The method of claim 1, wherein the semi-liquefaction step is carried out by mechanical action of a vibrating member.

8. The method of claim 7, wherein the vibrating member is a concrete vibrating device.

9. The method of claim 8, wherein the concrete vibrating device produces at least 10,000 vibrations per minute and is operated by a ¾ H.P. electric motor connected to an electric generator having a minimal capacity of 600 W.

10. The method of claim 1, wherein the reintroduction of the bacteriological liquid medium in all the compartments of the tank is carried out by mere gravity.

11. The method of claim 10, wherein the reintroduction of the bacteriological liquid medium in all the compartments of the tank is carried out by application of a pressure inside the storage tank.

12. A method for cleaning a septic tank comprising at least two successive fermentation and decantation compartments connected to each other by means of a lateral opening, each compartment containing a bacteriological liquid medium and a layer of heavy sludges sedimented or not in its bottom, the first one of said successive compartments also containing a layer of light liquid sludges floating on the surface of its bacteriological liquid medium, said method comprising the successive steps of:

slowly pumping the bacteriological liquid medium contained in all the compartments of the tank via the last compartment of the tank and storing it into a storage tank, said pumping being stopped when the light sludges start flowing through the lateral opening connecting the compartments to each other;

semi-liquifying the heavy sludges sedimented in the bottom of each compartments;

pumping the so semi-liquified heavy sludges and eventually the light sludges, together with the bacteriological medium contained in each compartments of the tank, below the level of lateral opening, and discharging them into said waste tank; and reintroducing the bacteriological liquid medium stored in said storage tank into all the compartments of the tank.

13. A method according to claim 12, wherein the light sludges, the bacteriological medium and the semi-liquified sludges are pumped toward their respective tank with vacuum pumps.

14. A method according to claim 12, wherein the light sludges, the bacteriological medium and the semi-liquified sludges are pumped toward their respective tank with a single vacuum pump connected to a by-pass conduct and a selection valve.

15. The method of claim 12, wherein the semi-liquefaction step is carried out by injection of high pressure water into the heavy sludges.

16. The method of claim 15, wherein water injection is carried out with a water hose nozzle connected to a pump having an outflow of 60 to 130 liters of water per minute under a minimal pressure of about 50 bar.

17. The method of claim 16, wherein water injection is carried out with a water hose nozzle connected to a pump having an outflow of 60 to 130 liters of water per minute under an average pressure of about 100 bar.

18. The method of claim 12, wherein the semi-liquefaction step is carried out by mechanical action of a vibrating member.

19. The method of claim 18, wherein the vibrating member is a concrete vibrating device.

20. The method of claim 19, wherein the concrete vibrating device produces at least 10,000 vibrations per minute, and is operated by a ¾ H.P. electric motor connected to an electric generator having, a minimal capacity of 600 W.

21. The method of claim 12, wherein the reintroduction of the bacteriological liquid medium in all the compartments of the tank is carried out by mere gravity.

22. The method of claim 21, wherein the reintroduction of the bacteriological liquid medium in all the compartments of the tank is carried out by application of a pressure inside the storage tank.

* * * * *